United States Patent [19]

Benavente et al.

[11] 4,032,189
[45] June 28, 1977

[54] MOTORCYCLE BACK REST ASSEMBLY

[76] Inventors: Vicente Cruz Benavente, 1372 Taper St., Long Beach, Calif. 90810; Jack C. Napper, 3815 Volk St., Long Beach, Calif. 90808

[22] Filed: June 21, 1976

[21] Appl. No.: 698,044

[52] U.S. Cl. .................................. 297/352; 297/383; 297/DIG. 9; 280/289 E
[51] Int. Cl.² .......................... B60N 1/06; B62J 1/28
[58] Field of Search ..... 297/352, 383, 361, DIG. 9, 297/195, 243

[56] References Cited
UNITED STATES PATENTS

| | | | |
|---|---|---|---|
| 592,783 | 11/1897 | Hess | 297/383 X |
| 1,966,343 | 7/1934 | Hallowell et al. | 297/383 X |
| 3,822,917 | 7/1974 | George | 297/DIG. 9 |
| 3,850,353 | 11/1974 | Foulds | 297/DIG. 9 |
| 3,901,534 | 8/1975 | Popken | 297/DIG. 9 |

Primary Examiner—Francis K. Zugel
Attorney, Agent, or Firm—William C. Babcock

[57] ABSTRACT

A longitudinally and angularly adjustable back rest assembly capable of being removably mounted on a motorcycle that has a rearwardly disposed frame portion that supports a second U-shaped frame that is secured to the base portion of an elongate seat. The seat is of sufficient length to support a single rider or a rider and a passenger. The back rest assembly may occupy any one of a number of longitudinal positions relative to the seat, and may be angularly adjusted when in any one of these positions. The back rest may accordingly be adjusted for use by either a single rider when he straddles the seat or a passenger when he occupies a like position rearwardly of the rider.

5 Claims, 7 Drawing Figures

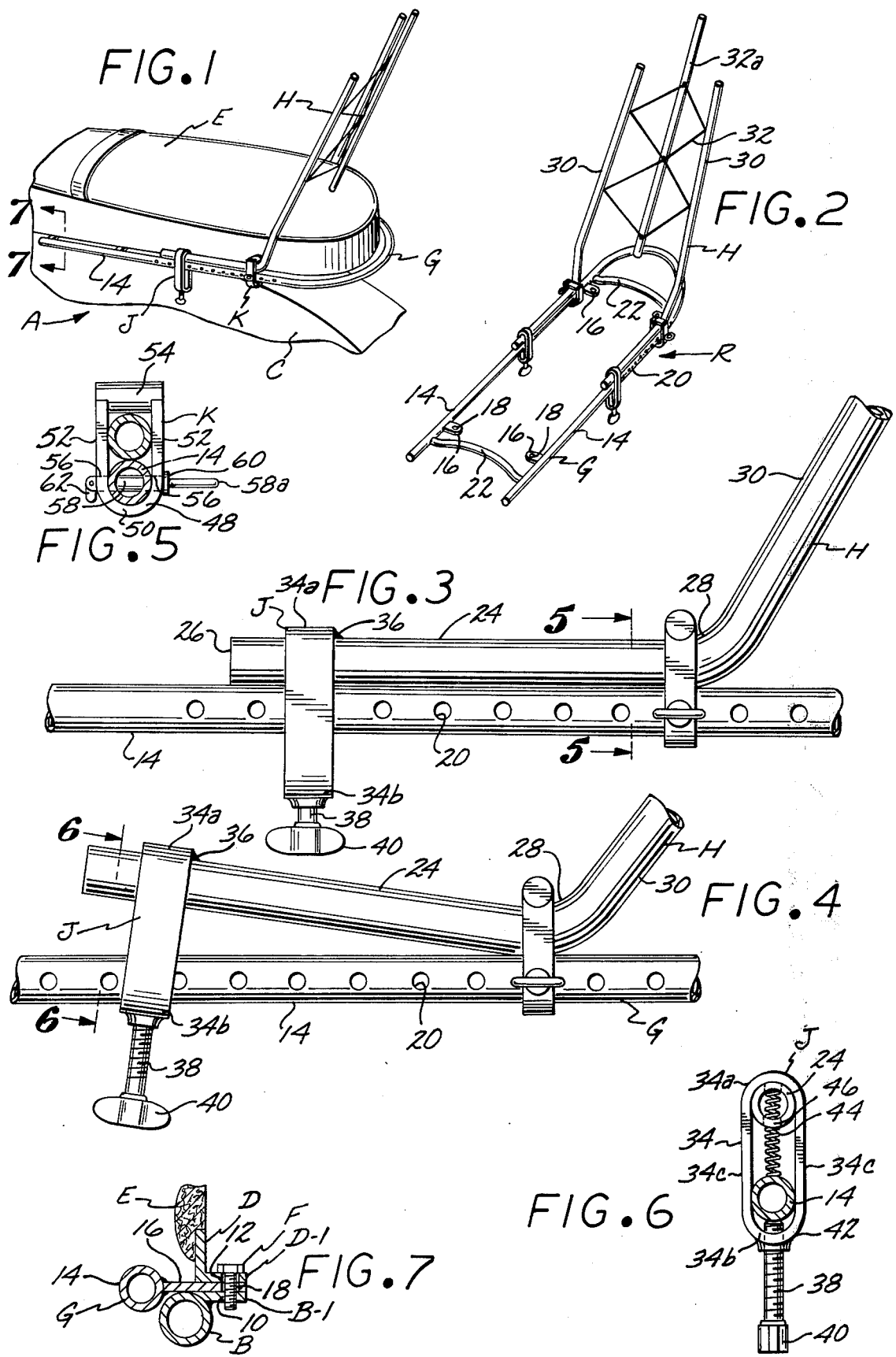

MOTORCYCLE BACK REST ASSEMBLY

BACKGROUND OF THE INVENTION

1. Field of the Invention

Motorcycle Back Rest Assembly.

2. Description of the Prior Art

In the past, it has been common practice to mount a back rest in a fixed position adjacent the rearward portion of an elongate longitudinally extending seat on a motorcycle. Such a seat may be used only by a passenger and not the rider who is guiding and operating the motorcycle.

A major object of the present invention is to provide a back rest assembly that may be removably mounted on a motorcycle and is so longitudinally and angularly adjustable relative to the elongate seat thereon that the assembly may be disposed for use by either a rider alone or a passenger seated rearwardly of the rider, and thus overcome operational deficiencies of prior art motorcycle back rests.

SUMMARY OF THE INVENTION

The back rest assembly is used in combination with a motorcycle that has a first rearwardly disposed frame that includes a pair of first parallel legs situated on opposite sides of a rearwardly disposed fender. An elongate longitudinally extending seat has a second U-shaped frame secured to the lower portion thereof, with the first frame and second frame including inturned flanges that are in horizontal abutting contact and secured to one another by threaded bolts that engage pairs of aligned tapped bores formed therein.

The back rest assembly includes a tubular U-shaped support that has a pair of first laterally spaced, parallel legs that are disposed outwardly from the longitudinally extending portions of the first frame, with each of the legs of the U-shaped support including a pair of longitudinally spaced inturned tabs that are gripped between the first and second inturned portions previously mentioned. Each of the tabs has a third bore therein that is aligned with one of the sets of first and second bores, and through which third bore one of the threaded members extends. The third U-shaped support includes forward and rearwardly disposed rigid transverse cross pieces for reinforcing purposes.

A back rest is provided that includes a pair of second laterally spaced parallel legs that have first and second ends, with the second pair of legs overlying the first pair of legs, and the second legs at the second ends thereof affecting junctions with a pair of elongate extensions that project upwardly and rearwardly at an angle. The back rest has a number of rigid cross-members extending therebetween to maintain the extensions in fixed lateral spacings.

A pair of spring loaded slide members are rigidly secured to the pair of second legs adjacent the first ends thereof, with the slide members slidably engaging the first legs for longitudinal movement between the pairs of inturned tabs previously, mentioned.

A pair of pivot members are provided that pivotally engage the back rest at the junctions thereon, with the pivot members slidably engaging the first pair of legs and being longitudinally movable to any one of a number of positions between the pair of tabs. A pair of first manually operated means are provided for selectively holding the pair of pivot members at any one of a number of longitudinally spaced positions on the first pair of legs. Also, a pair of second manually operated means are provided for selectively moving the pair of slide members either up or down relative to the first pair of legs to pivot the back rest to a position where the pair of extensions and cross members are disposed at a desired angle relative to the seat. Thus, the back rest assembly may be adjusted to any one of a number of longitudinal positions relative to the seat, and when disposed in that position have the back rest adjusted to a desired angle relative to the seat.

BRIEF DESCRIPTION OF THE DRAWINGS

FIG. 1 is a perspective view of the back rest assembly removably supported for longitudinal and angular adjustment relative to an elongate seat that forms a part of the motorcycle;

FIG. 2 is a perspective view of the back rest assembly removed from the motorcycle;

FIG. 3 is a side elevational view of the back rest assembly in a first position relative to the motorcycle;

FIG. 4 is a second side elevational view of the back rest assembly with the back rest assembly having been adjusted to a tilted position;

FIG. 5 is a fragmentary cross sectional view of the back rest assembly taken on the line 5—5 of FIG. 3;

FIG. 6 is a fragmentary transverse cross sectional view of the back rest assembly taken on the line 6—6 of FIG. 4; and FIG. 7 is a transverse cross-sectional view of a part of the back rest assembly and the frame that forms a part of the motorcycle and from which the back rest assembly is removably secured.

DESCRIPTION OF THE PREFERRED EMBODIMENT

The back rest assembly R, as may best be seen in FIGS. 1 and 7, is adapted to be removably mounted on a motorcycle A that has a first frame B that extends on opposite sides of a rearwardly disposed fender C. The motorcycle A includes a second frame D that extends longitudinally along opposite sides of an elongate seat E. The first and second frames B and D have inturned flanges B-1 and D-1 that are in vertical alignment and removably held in this position by a number of bolts F that extend through first and second bores 10 and 12 that are vertically aligned and formed in the inturned portions. The back rest assembly R includes a tubular U-shaped support G that has a pair of laterally spaced first legs 14, with each leg having a pair of longitudinally spaced tabs 16 that extend inwardly therefrom. Each of the tabs has a third bore 18 formed therein that may be vertically aligned with one of the sets of first and second bores 10 and 12, when the tab in which the third bore 18 is formed is situated between the first and second inturned flanges B-1 and D-1 as shown in FIG. 7. When the third bore 18 is so disposed one of the bolts F extends therethrough, to removably lock the U-shaped support G in a fixed outwardly disposed position relative to the first frame B as shown in FIG. 7. Each of the first legs 14 has a number of longitudinally spaced sets of horizontally aligned openings 20 formed therein as shown in FIGS. 1, 3 and 4. The first legs 14 are maintained in fixed laterally spaced relationship by two or more cross members 22 that extend therebetween, as may be seen in FIG. 2.

The back rest H is defined by a pair of laterally spaced tubular legs 24, with each leg having a first end 26 and a second end 28 of curved configuration that forms a junction with a second leg extension that projects upwardly and rearwardly as may be seen in FIGS. 1 to 4 inclusive. The second legs 30 have a number of reinforcing members 32 extending therebetween, with the reinforcing members, at their centers, preferably supporting an upwardly extending rigid member 32a.

The second legs 14 have slide members J rigidly secured to the first ends 26 thereof as may be seen in FIGS. 3 and 4. Each of the slide members J includes an elongate vertically disposed link 34 that has a first upwardly disposed curved end 34a, a lower arcuately shaped second end 34b, and a pair of straight laterally spaced sides 34c that extend between the curved ends. Each of the slide members J is rigidly secured to one of the second legs 24 adjacent the first end 26 thereof. The slide member J is rigidly secured to the second leg 24 by a welding bead 36 or the like. Each curved end 34b has a tapped bore 42 extending upwardly therethrough that is engaged by a screw 38, which screw is provided with a handle 40 on the lower end thereof. Each slide member J also includes an elongate compressed helical spring 44 that has one end in abutting contact with the interior surface of the first curved end 34a with the spring extending downwardly through a pair of aligned bores 46 formed in the second leg 24 with which the spring is associated. The spring 44 has a lower free end that is in sliding frictional contact with the upper surface of one of the first legs 14 as shown in FIG. 6.

The back rest assembly R also includes a pair of pivot assemblies K that are longitudinally movable relative to the pair of second legs 24 but with the pivot assemblies normally occupying a position where they are in contact with the second ends 28 that define the junction between the second legs 24 and leg extensions 30, as illustrated in FIGS. 3 and 4. Each of the pivot assemblies K includes a U-shaped member 48 as best seen in FIG. 5 and has an arcuate web 50 from which two laterally spaced parallel arms 52 extend. A cross member 54 extends between the free ends of the arms 52 and is adapted to pivotally engage one of the junctions 28 as shown in FIGS. 3 and 4. The two arms 52 of each pivot assembly K have two transversely aligned bores 56 formed therein adjacent the web 50. A pair of elongate pins 58 are provided as may be seen in FIG. 5, that have stops formed on intermediate positions thereon, and these pins capable of being extended through one of the pairs of bores 56 and pair of bores 20 formed in the first leg 14, to maintain the pivot assembly K at a desired longitudinal position on the U-shaped support G. Each of the pins 48 has a pivotally supported dog 62 on one end thereof that may be disposed transversely to the pin to maintain it in a holding position as shown in FIG. 5. The pin defines a handle 58a on the end portion thereof opposite that on which the dog 62 is mounted.

After the back rest assembly R has been removably mounted on the motorcycle A as above described, it may be adjusted to any one of a number of longitudinal positions on the U-shaped support G by aligning a desired pair of the bores 20 with a pair of the bores 56 and extending the one of the pins 58 therethrough. When this operation is performed, the back rest H will occupy a first position as shown in FIG. 3. When it is desired to pivot the back rest H to an angular position, the handle 40, screw 38 is rotated in appropriate positions, to permit the spring 44 to expand and tilt the back rest H rearwardly to a second position as illustrated in FIG. 4.

When it is desired to adjust the back rest H to another angular position, the screws 38 are rotated in the appropriate direction to accomplish this result. Likewise, when it is desired to adjust the back rest H longitudinally on the U-shaped support G, the pins 68 are disengaged from the pair of bores 56 and bores 20, and the bracket assembly R is then slid longitudinally on the support G to a desired location relative to the seat E, with the back rest assembly then being secured in a fixed longitudinal position by causing the pins 58 to engage a desired pair of bores 20 and the bores 56. Should it be desired to remove that back rest assembly R from the motorcycle A, this is easily and simply done by reversing the operation that was carried out in mounting the back rest assembly on the motorcycle A.

The use and operation of the invention has been described previously in detail and need not be repeated.

We claim:

1. In combination with a motorcycle that has a first frame that includes a pair of first parallel legs disposed on opposite sides of a rearwardly disposed fender, an elongate longitudinally extending seat, a second frame secured to said seat, said first and second frames including first and second inturned portions having a plurality of longitudinally spaced sets of first and second bores therein, a plurality of threaded members that engage said sets of first and second apertures and removably lock said seat and second frame to said first frame, a back rest assembly that is longitudinally and pivotally adjustable relative to said seat, said backrest assembly including:

a. a tubular U-shaped support that includes a pair of first, laterally spaced, parallel legs that are disposed outwardly from said first frame, each of said first legs including a pair of longitudinally spaced inturned tabs that are gripped between said first and second inturned portions, each of said tabs having a third bore therein that is aligned with one of said sets of said first and second bores and through which third bore one of said threaded members extends;
    b. forward and rearwardly disposed rigid cross pieces that extend between said first legs and are rigidly secured thereto;
    c. a back rest that includes a pair of second laterally spaced parallel legs that have first and second ends, said second legs overlying said first pair of legs, with said second legs at said second ends effecting junctions with a pair of elongate extensions that project upwardly and angle rearwardly relative to said second pair of legs, and said back rest having a plurality of rigid cross members extending therebetween to maintain said extensions in fixed lateral spacing;
    d. a pair of spring loaded slide means rigidly secured to said pair of said second legs adjacent said first ends thereof, said slide means slidably engaging said first legs for longitudinal movement between said pairs of inturned tabs;
    e. a pair of pivot means that pivotally engage said back rest at said junctions, said pivot means slidably engaging said first pair of legs and being longitudinally movable to a plurality of positions between said pairs of tabs;
    f. a pair of first manually operable means for selectively holding said pair of pivot means at any one of a plurality of longitudinally spaced positions on said first pair of legs; and g. a pair of second manually operated means for selectively moving said pair of slide means either up or down relative to said first pair of legs to pivot said back rest to a position where said pair of extension and cross members are disposed at a desired angle relative to said seat.

2. A back rest assembly as defined in claim 1 in which each of said slide means includes:

h. an elongate rigid link that has first and second curved ends, and a pair of laterally spaced, parallel side members that connect said first and second curved ends, said link having one of said first and second legs extending therethrough, said second curved end in abutting contact with said second leg and rigidly secured thereto; and i. an elongate compressed helical spring that has first and second ends, said second end in abutting contact with said second curved end and said spring extending downwardly through an opening in said second leg, with said first end of said spring in pressure frictional contact with said first leg.

3. A back rest assembly as defined in claim 2 in which each of said second manually operated means includes:

j. a threaded member that has first and second ends, said threaded member in engagement with a transverse tapped bore in said first curved end of said link, with said first end in pressure contact with said first leg; and k. a handle on said second end of said threaded member for manually rotating said threaded member, with said threaded member when rotated moving said link relative to said first leg to pivot said back rest to a desired angular position relative to said seat.

4. A back rest as defined in claim 1 in which each of said pivot means includes:

h. a rigid U-shaped member that extends upwardly around one of said first legs and includes two laterally spaced parallel members that have free ends, said members have transversely aligned first openings therein that may be aligned with any desired one of a plurality of second transverse openings in said first leg with which said U-shaped member is operatively associated;

i. a pin that may be extended through said first pair of transverse openings and one of said second transverse opening to hold said U-shaped member at a desired longitudinal position on said first leg; and j. a rigid transverse member that extends between said first free ends and over said junction to permit said back rest to pivot relative to said pair of first legs.

5. A bracket assembly as defined in claim 1 in which said rearwardly disposed cross piece is arcuate in shape and is in abutting contact with said rearward fender.

* * * * *